US012591582B2

(12) United States Patent
Grappin et al.

(10) Patent No.: US 12,591,582 B2
(45) Date of Patent: Mar. 31, 2026

(54) SERVER AND METHOD FOR GENERATING DIGITAL CONTENT FOR USERS OF A RECOMMENDATION SYSTEM

(71) Applicant: COMMUNAUTE WOOPEN INC., Montreal (CA)

(72) Inventors: Edwin Grappin, Seville (ES); Jerome Verdier, Montreal (CA)

(73) Assignee: COMMUNAUTE WOOPEN INC., Montreal (CA)

( * ) Notice: Subject to any disclaimer, the term of this patent is extended or adjusted under 35 U.S.C. 154(b) by 0 days.

(21) Appl. No.: 18/719,013

(22) PCT Filed: Dec. 13, 2022

(86) PCT No.: PCT/IB2022/062135
§ 371 (c)(1),
(2) Date: Jun. 12, 2024

(87) PCT Pub. No.: WO2023/111842
PCT Pub. Date: Jun. 22, 2023

(65) Prior Publication Data
US 2025/0045281 A1 Feb. 6, 2025

(30) Foreign Application Priority Data
Dec. 13, 2021 (EP) .................................... 21306761

(51) Int. Cl.
*G06F 16/245* (2019.01)
*G06F 16/2457* (2019.01)
*G06F 16/9535* (2019.01)
(52) U.S. Cl.
CPC .... *G06F 16/24578* (2019.01); *G06F 16/9535* (2019.01)

(58) Field of Classification Search
CPC ....................... G06F 16/24578; G06F 16/9535
See application file for complete search history.

(56) References Cited

U.S. PATENT DOCUMENTS

| | | | |
|---|---|---|---|
| 10,043,133 | B2 | 8/2018 | Mcfall |
| 10,412,454 | B2 | 9/2019 | Docherty et al. |
| 10,674,215 | B2 | 6/2020 | Sokolov et al. |

(Continued)

FOREIGN PATENT DOCUMENTS

| | | |
|---|---|---|
| CN | 113 297 467 A | 8/2021 |
| WO | 2020081969 A2 | 4/2020 |

OTHER PUBLICATIONS

International Search Report from PCT3IB2022/062135, Mar. 21, 2023, Donald Lefebvre.

(Continued)

*Primary Examiner* — Truong V Vo

(74) *Attorney, Agent, or Firm* — BCF LLP

(57) ABSTRACT

A method and server for generating content for a user are disclosed. The method includes generating, via a first model, a first output for the user. The first output is representative of a predicted item of a first type. The method includes ranking, via a second model, the items of the second type into a ranked list based on the first output. A rank of an item is indicative of a likelihood of that the user interacts with the given item of the second type if the user performs an event of the pre-determined type on the given predicted item of the first type. Content is then selected from the ranked list and transmitted to a user device.

20 Claims, 7 Drawing Sheets

(56) References Cited

U.S. PATENT DOCUMENTS

| | | | |
|---|---|---|---|
| 10,762,153 | B2 | 9/2020 | Puri et al. |
| 10,810,616 | B2 | 10/2020 | Modarresi |
| 11,151,208 | B2 | 10/2021 | Miller et al. |
| 11,163,777 | B2 | 11/2021 | Ghoshal et al. |
| 2018/0075137 | A1 | 3/2018 | Lifar et al. |
| 2020/0252690 | A1 | 8/2020 | Docherty et al. |
| 2021/0241346 | A1 | 8/2021 | Theocharous et al. |

OTHER PUBLICATIONS

European Search Report from EP 22 90 6783 dated Jun. 18, 2025, Berlea, Alexandru.
English translation of CN 113 297 467 A, received with the European Search Report from EP 22 90 6783 dated Jun. 18, 2025.
Ji Wendi et al, "Two-stage Sequential 1-15, Recommendation via Bidirectional Attentive Behavior Embedding and Long/Short-term Integration", 2020 IEEE International Conference on Knowledge Graph (ICKG), Aug. 9, 2020 (Aug. 9, 2020), pp. 449-457, XP033823329, retrieved on Sep. 10, 2020.

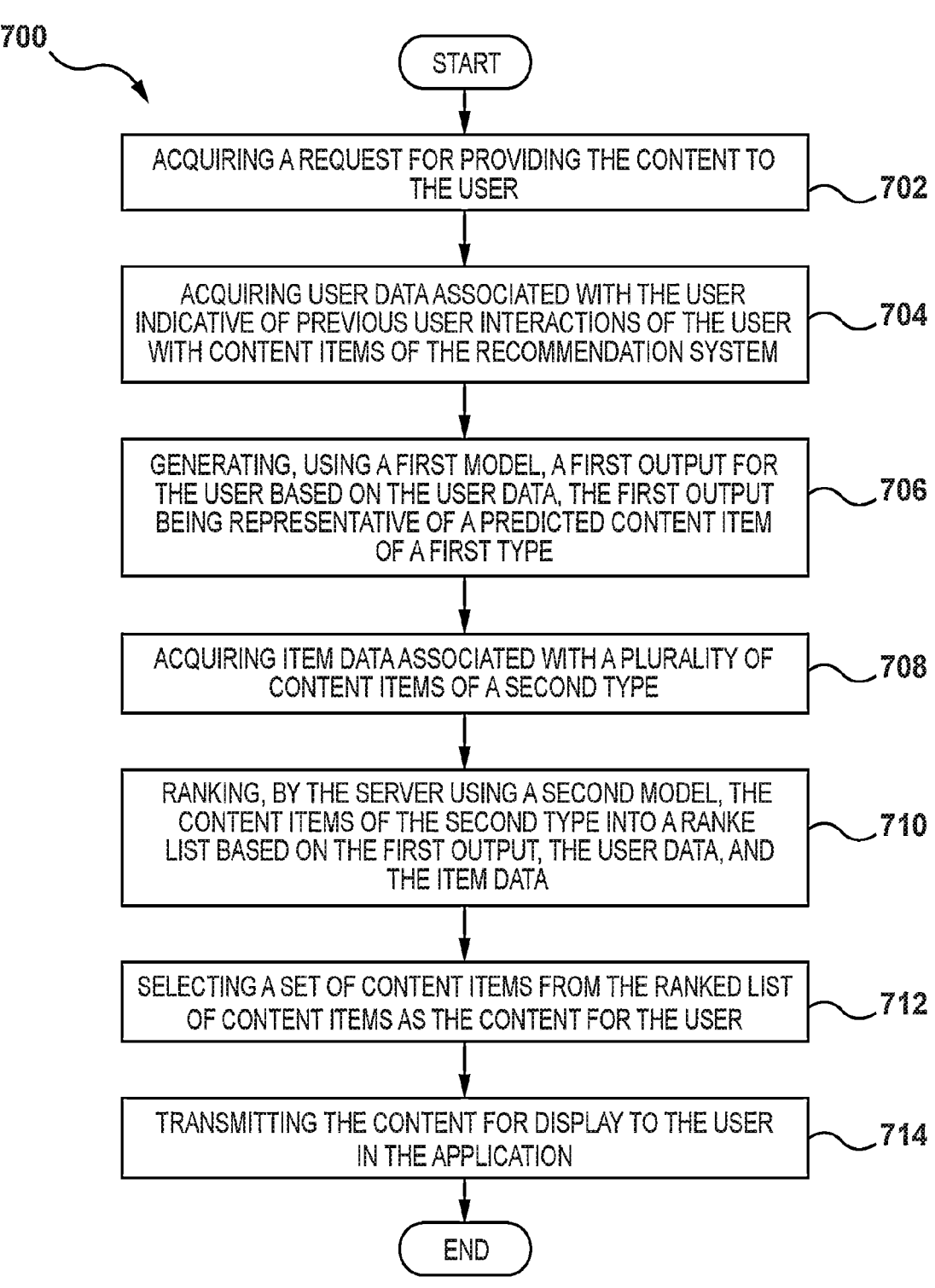

700

START

ACQUIRING A REQUEST FOR PROVIDING THE CONTENT TO THE USER ⌐702

ACQUIRING USER DATA ASSOCIATED WITH THE USER INDICATIVE OF PREVIOUS USER INTERACTIONS OF THE USER WITH CONTENT ITEMS OF THE RECOMMENDATION SYSTEM ⌐704

GENERATING, USING A FIRST MODEL, A FIRST OUTPUT FOR THE USER BASED ON THE USER DATA, THE FIRST OUTPUT BEING REPRESENTATIVE OF A PREDICTED CONTENT ITEM OF A FIRST TYPE ⌐706

ACQUIRING ITEM DATA ASSOCIATED WITH A PLURALITY OF CONTENT ITEMS OF A SECOND TYPE ⌐708

RANKING, BY THE SERVER USING A SECOND MODEL, THE CONTENT ITEMS OF THE SECOND TYPE INTO A RANKE LIST BASED ON THE FIRST OUTPUT, THE USER DATA, AND THE ITEM DATA ⌐710

SELECTING A SET OF CONTENT ITEMS FROM THE RANKED LIST OF CONTENT ITEMS AS THE CONTENT FOR THE USER ⌐712

TRANSMITTING THE CONTENT FOR DISPLAY TO THE USER IN THE APPLICATION ⌐714

END

FIGURE 7

SERVER AND METHOD FOR GENERATING DIGITAL CONTENT FOR USERS OF A RECOMMENDATION SYSTEM

FIELD

The present technology relates to computer-implemented recommendation systems. In particular, servers and methods for generating digital content for users of a recommendation system are disclosed.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Spain?" The search engine will then present a ranked list of Internet resources that are potentially relevant to the search query. The user can then browse the ranked list of search results in order to obtain information she/he is interested in as it related to places to visit in Spain. If the user, for whatever reason, is not satisfied with the uncovered search results, the user can re-run the search, for example, with a more focused search query.

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a NETFLIX™ recommendation system, which system aggregates and recommends video content. The recommendation system stores video content about a variety of movies and tv-series, and presents some of it to a user, effectively "recommending" content to a given user even though the user may not have expressly expressed her/his desire in the particular content.

In some cases, potentially recommendable content of a recommendation system may be collected from one or more service providers (SP), or "third-party providers", which usually advertise their respective services on various virtual platforms that may be accessed on the Internet. Users of said platforms are generally displayed with digital items (e.g. profiles, service offers, etc.) associated with the SPs on their personal devices (e.g. smartphones, personal computer, etc.). However, a quality of a service may greatly vary one SP to another. Therefore, such platforms enable users to rate and/or endorse different SPs that provided them with a service.

Even though the recent developments identified above may provide benefits, improvements are still desirable.

SUMMARY

Embodiments of the present technology have been developed based on developers' appreciation of shortcomings associated with the prior art. In the context of the present technology, there is provided a recommendation system for recommending content to users of a recommendation platform.

In at least some embodiments of the present technology, the recommendation system may be a "commercially-oriented" recommendation system. Broadly speaking, a given commercially-oriented recommendation system may be of use to SPs that operate in a common commercial environment. Hence, users of such a system may be provided with digital content that is specific to a given commercial environment.

For instance, the recommendation system may be embodied as a given real-estate-oriented recommendation system where SPs operate in the real-estate sector. Such SPs may include, but are not limited to: designers, real estate agents, contractors, electricians, plumbers, insurance companies, decorators, landscaping agency, and so forth. Users of such a recommendation system may be provided with a digital content feed including real-estate-oriented digital content from the SPs non-exhaustively listed immediately above.

In another instance, the recommendation system may be embodied as a given car-oriented recommendation system where SPs operate in the car/automotive sector. Such SPs may include, but are not limited to: dealerships, insurance companies, after-market body shops, car repairing shops, manufacturers, valuators, mechanics, and so forth. Users of such a recommendation system may be provided with a digital content feed including car-oriented digital content from the SPs non-exhaustively listed immediately above.

In a further instance, the recommendation system may be embodied as a given healthcare-oriented recommendation system where SPs operate in a healthcare sector. Such SPs may comprise: doctors, clinics, chiropractors, personal trainers, gyms, nutritionists, supplement manufacturers, training equipment distributors, and so forth. Users of such a recommendation system may be provided with a digital content feed including healthcare-oriented digital content from the SPs non-exhaustively listed immediately above.

In an additional instance, the recommendation system may be embodied as a given tourism-oriented or travel-oriented recommendation system where SPs operate in a travel or tourism sector. Such SPs may comprise: travel agents, airline companies, hotels, car rental companies, and so forth. Users of such a recommendation system may be provided with a digital content feed including tourism-oriented or travel-oriented digital content form the SPs non-exhaustively listed immediately above.

It is contemplated that the recommendation system may be embodied as a hybrid recommendation system where SPs operate in more than one of a travel sector, automotive sector, healthcare sector, real-estate sector, and the like, and without departing from the scope of the present technology.

Generally speaking, users perform "events" while inter-acting with digital content recommended thereto, and which can be tracked, collected, and stored in the form of user-item interaction data. Developers of the present technology have realized that user-item interaction data between users and digital content items may include "frequent" events and comparatively "rare" events.

On the one hand, frequent events refer to events between users and digital content items that typically occur in large numbers and include events such as, for example, a user "liking" or "selecting" a given digital item. On the other hand, rare events refer to events between users and digital content items that occur in comparatively low numbers such as, for example, the purchase of a unique or non-duplicable digital item.

To better illustrate this, let's consider an example where a first digital content item is representative of a serially produced article such as a lamp, and a second digital content item is representative of a real-estate property such as a house. The lamp may be one of many of its kind, while the particular house is unique and non-duplicable.

In this example, users may perform frequent events on both the first digital content item and the second digital content item. These frequent events may represent users "liking" and/or "selecting" the digital item representative of the particular lamp and/or the particular house. The frequent events may also represent "purchases" of the first digital item by a large number of users, since a given SP may sell a large number of these particular lamps to users of the recommendation service.

In addition to the above, users of the recommendation system may perform rare events with the second digital content item. These rare events may represent "purchases" of the second digital item by a limited number of users, since a particular house is purchased rarely (similarly to other unique and/or non-duplicable items), generally every few years or so.

In at least some embodiments of the present technology, it is contemplated that frequent events may be events that occur at a frequency ratio that is above a threshold frequency ratio. The frequency ratio may be defined as a number of events of a pre-determined type (e.g., purchasing events) performed by users on a given digital content item over a number of times that users have been presented with an indication of the event of a pre-determined type having been performed on the given digital content item. For example, let it be assumed that a given digital item has been purchased once, and an indication of the purchase of the given digital item has been presented to users fifteen times. In this example, the frequency ratio is 1/15.

Developers of the present technology have devised a recommendation system that can recommend the digital items of different types, including a first type and a second type. In some embodiments of the present technology, the recommendation system may be configured to classify a pool of items into a first plurality of items of a first type and a second plurality of items of a second type. The classification process may be performed based on event data associated with items form the pool of items. More particu-larly, the classification process may be performed based on a number of events of a pre-determined type associated with respective items from the pool of items.

Digital items of a first type contain digital items that are associated with a limited number of events of a pre-deter-mined type and/or a frequency ratio below a pre-determined threshold. For example, digital items of the first type may contain digital items that are associated with a limited number of "purchasing" events and/or a limited number of "renting" events and/or a limited number of events of an other type having been determined by an operator of the recommendation system. In another example, digital items of the first type may contain digital items that are associated with a low ratio of a number of "purchasing" events over a number of times the given digital item has been presented to users and/or a low ratio of a number of "renting" events over a number of times the given digital item has been presented to users. Determination of a low ratio may be performed via comparison of a given ratio against a threshold ratio. It is contemplated that the digital items of the first type may contain digital items that are representative of unique prod-ucts and/or services. For example, digital items of a first type may comprise digital items representative of unique real-estate properties.

Digital items of a second type contain digital items that are associated with a large number of events of that pre-determined type. For example, digital items of the second type may contain digital items that are associated with a large number of "purchasing" events and/or a large number of "renting" events and/or a large number of events of the other type having been determined by the operator of the recommendation system 100. In another example, digital items of the first type may contain digital items that are associated with a large ratio of a number of "purchasing" events over a number of times the given digital item has been presented to users and/or a large ratio of a number of "renting" events over a number of times the given digital item has been presented to users. Determination of a large ratio may be performed via comparison of a given ratio against a threshold ratio. It is contemplated that the digital items of the second type may contain digital items that are representative of serially produced products and/or non-unique services.

In at least some aspects of the present technology, a current number of events of the pre-determined type asso-ciated with a given digital item available for recommenda-tion may be compared to a threshold number. This may be performed for determining a type of that digital item. In some embodiments, item classification into different types of items may yield different groups of items. It is contem-plated that in other embodiments of the present technology, the classification process may yield more than two groups of items. For example, a current number of events of the pre-determined type associated with a given digital item may be compared against more than one threshold number and may be included into one of more than two groups of items.

For example, the pre-determined type of events (e.g., "purchasing" events) may be determined by the operator of the recommendation system. A current number of events of that type associated with a given digital item may then be compared to a threshold number of events of that type-if the current number is below the threshold number, the given digital item may be classified as being of a first type, or otherwise as being of a second type. It is contemplated that, following the classification process, a first group of items including items of the first type may be stored in a storage for future use thereof. Similarly, following the classification process, a second group of items including items of the second type may be stored in the storage for future use thereof.

Developers of the present technology have realized that predicting a digital item of the first type for a given user, and then using this information for determining recommended content comprising items of the second type, may reduce the dimensionality of the recommendation problem and thus rank recommended content based on a more accurate estimation of likelihood of interaction with that content. In other words, using information about a predicted item of a first type for a given user may allow the recommendation system to rank potentially recommendable content for the user based on a likelihood of that the user will interact with the given potentially recommendable content item as if the user has performed an event of the pre-determined type on the given predicted content item of the first type.

In one non-limiting example, the system may generate a predicted content item representative of a real-estate property which has a limited number of events of the "purchasing" type associated therewith. Such prediction may then be used when ranking potentially recommendable content. Therefore, the system may rank potential recommendable content items for the given user based on a likelihood of the user interacting with the given potentially recommendable content item if the user purchases the predicted real-estate property.

Commonly referred to as a "cold start" problem, is a problem associated with computer-implemented recommendation systems which involves a degree of automated data modelling. Specifically, the computer system may not be well suited to draw inferences for users or items about which it has not yet gathered sufficient information. The cold start problem is a well-researched problem in computer-implemented arts. Different types of approaches may be applied to mitigate the cold start problem, some may be adapted for recommendation techniques based on item characteristics (called "content-based filtering" techniques), while others may be adapted for recommendation techniques based on user's social environment and past behavior (called "collaborative filtering" techniques). Other approaches may be adapted for recommendation techniques based on both item characteristics and user characteristics (called "hybrid filtering" techniques). Different approaches may be implemented to mitigate the cold-start problem.

In a first broad aspect of the present technology, there is provided a computer-implemented method of generating content for a user. The content is to be displayed by an electronic device executing an application, the electronic device being communicatively coupled to a server by a communication network, the server hosting a recommendation system, and the method is executable by the server. The method comprises acquiring, by the server from the electronic device over the communication network, a request for providing the content to the user. The method comprises acquiring, by the server, user data associated with the user indicative of previous user interactions of the user with content items of the recommendation system. The method comprises generating, by the server using a first model, a first output for the user based on the user data, the first output being representative of a synthesized content item of a first type. Content items of the first type have a frequency ratio below a threshold ratio, the frequency ratio being a number of events of a pre-determined type that have been performed on a given content item by users of the recommendation system over a number of times that users have been presented with an indication of the events of the pre-determined type having been performed on the given digital content item. The method comprises acquiring, by the server, item data associated with a plurality of content items of a second type, the first type being distinct from the second type, content items of the second type having a frequency ratio above the threshold ratio. The method comprises ranking, by the server using a second model, the content items of the second type into a ranked list based on the first output, the user data, and the item data. A rank of a given content item of the second type being indicative of a likelihood of that the user interacts with the given content item of the second type if the user performs an event of the pre-determined type on the given predicted content item of the first type. The method comprises selecting, by the server, a set of content items from the ranked list of content items as the content for the user. The method comprises transmitting, by the server to the electronic device over the communication network, the content for display to the user in the application.

In some embodiments of the method, the first model is a generative model, and wherein the first output is a generative output representing the synthesized content item of the first type.

In some embodiments of the method, the content items of the first type in recommendation system exclude the synthesized content item of the first type.

In some embodiments of the method, the content items of the first type in recommendation system include the synthesized content item of the first type.

In some embodiments of the method, the method further comprises acquiring item data associated with a plurality of content items of the first type, and wherein the ranking further comprises ranking, by the server, the plurality of content items of the first type and the plurality of content items of the second type into the ranked list of content items.

In some embodiments of the method, the selecting comprises excluding, by the server, from the set of content items at least one content item in the ranked list of content items.

In some embodiments of the method, the excluding comprises determining, by the server, a similarity score of an other content item in the ranked list with the at least one content item, the other content item being ranked above the at least one content item, in response to the similarity score being above a pre-determined threshold, and excluding, by the server, the at least one content item from the set of content items.

In some embodiments of the method, the content items of the first type are non-duplicable content items.

In some embodiments of the method, the content items of the first type are real-estate properties.

In some embodiments of the method, the content items of the second type are serially produced content items.

In a second broad aspect of the present technology, a server for generating content for a user, the content to be displayed by an electronic device executing an application, the electronic device being communicatively coupled to the server by a communication network, and the server hosts a recommendation system. The server is configured to acquire, from the electronic device over the communication network, a request for providing the content to the user. The server is configured to acquire user data associated with the user indicative of previous user interactions of the user with content items of the recommendation system. The server is configured to generate, using a first model, a first output for the user based on the user data, the first output being representative of a synthesized content item of a first type. Content items of the first type having a frequency ratio below a threshold ratio, the frequency ratio being a number of events of a pre-determined type that have been performed on a given content item by users of the recommendation system over a number of times that users have been presented with an indication of the events of the pre-determined type having been performed on the given digital content item. The server is configured to acquire item data associated with a plurality of content items of a second type, the first type being distinct from the second type, content items of the second type having a frequency ratio above the threshold ratio. The server is configured to rank, using a second model, the content items of the second type into a ranked list based on the first output, the user data, and the item data. A rank of a given content item of the second type is indicative of a likelihood of that the user interacts with the given content item of the second type if the user performs an event of the pre-determined type on the given predicted content item of the first type. The server is configured to select a set of content items from the ranked list of content items as the content for the user. The server is configured to transmit, to the electronic device over the communication network, the content for display to the user in the application.

In some embodiments of the server, the first model is a generative model, and wherein the first output is a generative output representing the synthesized content item of the first type.

In some embodiments of the server, the content items of the first type in recommendation system exclude the synthesized content item of the first type.

In some embodiments of the server, the content items of the first type in recommendation system include the synthesized content item of the first type.

In some embodiments of the server, the server is further configured to acquire item data associated with a plurality of content items of the first type, and wherein the server configured to rank is further configured to rank the plurality of content items of the first type and the plurality of content items of the second type into the ranked list of content items.

In some embodiments of the server, the server configured to select is configured to exclude from the set of content items at least one content item in the ranked list of content items.

In some embodiments of the server, the server configured to exclude is configured to determine a similarity score of an other content item in the ranked list with the at least one content item, the other content item being ranked above the at least one content item, in response to the similarity score being above a pre-determined threshold, the server is configured to exclude the at least one content item from the set of content items.

In some embodiments of the server, the content items of the first type are non-duplicable content items.

In some embodiments of the server, the content items of the first type are real-estate properties.

In some embodiments of the server, the content items of the second type are serially produced content items.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings.

FIG. 3 depicts a representation of data stored by a database of the recommendation environment of FIG. 1 in accordance with non-limiting embodiments of the present technology.

FIG. 7 is a scheme-block representation of a method executable by a server of the recommendation engine of FIG. 4 in accordance with non-limiting embodiments of the present technology.

Figure 1:
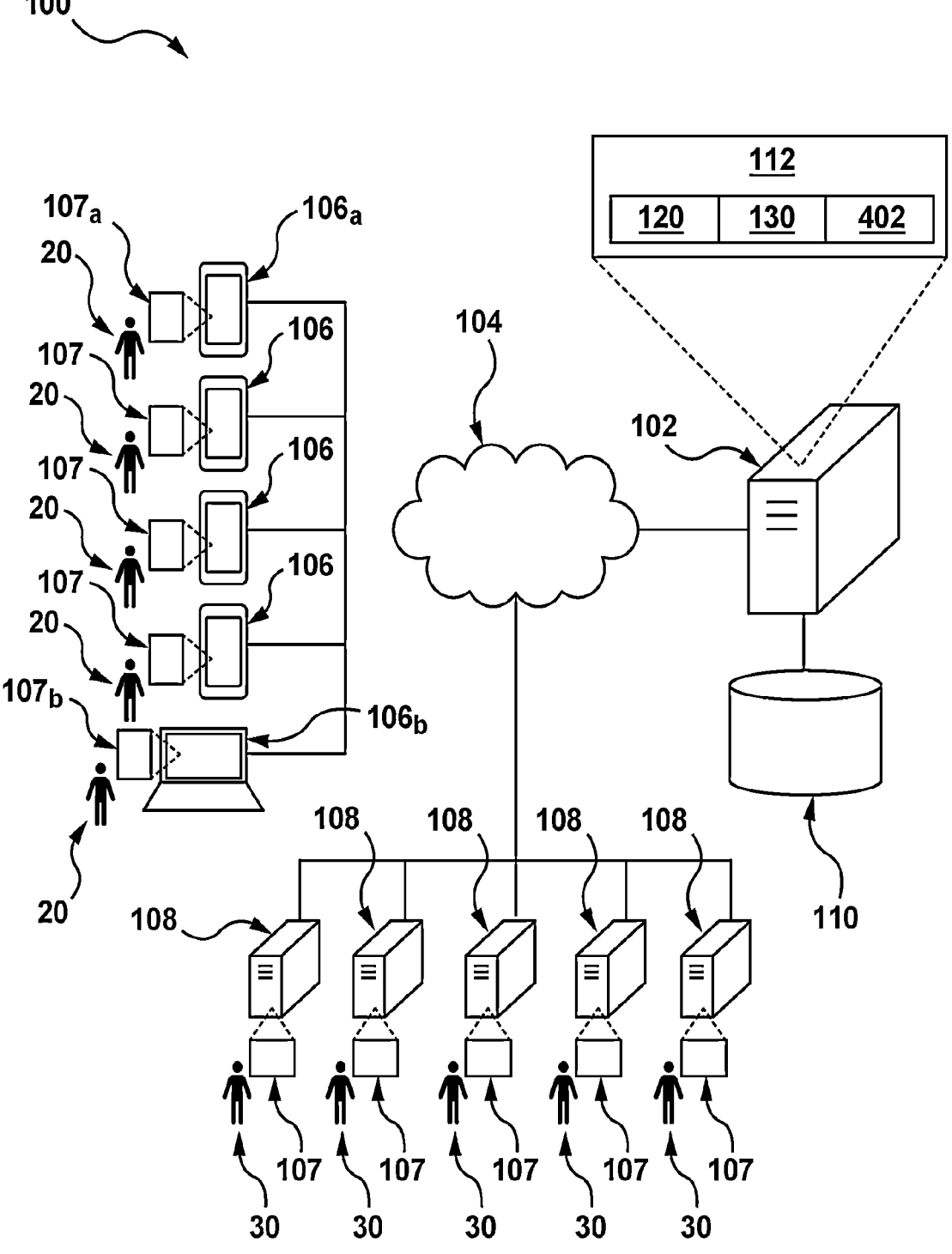
FIG. 1 is a schematic representation of recommendation environment in accordance with non-limiting embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide digital content recommendations and, more particularly, recommendations of digital items and/or of SPs to users of the system 100. For example, a user 20 (a given one of a plurality of users of the system 100) may be a subscriber to a recommendation service provided by the system 100. However, the subscription does not need to be explicit or paid for. For example, the user 20 can become a subscriber by virtue of downloading a recommendation application from the system 100, by registering and provisioning a log-in/password combination, by registering and provisioning user preferences and the like. As such, any system variation configured to generate digital items recommendations or, more generally, "content recommendations" for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100" or a "training system 100"). However, embodiments of the present technology can be equally applied to other types of the system 100, as will be described in greater detail herein below.

The system 100 may be, for example, used as a system for recommending real-estate-oriented content. In this example, the users may be individuals searching for real-estate related products, services and/or counsel. The users may thus use the recommendation system 100 to be recommended specific SPs such as plumbers, designers, carpenter, gardener, etc., and/or products such as swimming-pools, houses, furniture, etc.

In other non-limiting embodiments, the system 100 may be, for example, used a system for recommending content about the car industry. In this example, the users may be individuals searching for car related products, services and/ or counsel. The users may thus use the recommendation system 100 to be recommended specific SPs such as vehicle manufacturers, specialist coach builders, garage owners, original equipment manufacturers (OEM), automotive parts retailers, car insurance providers, etc., and/or products such as automotive parts, tires, etc.

More generally, the system 100 may be used as a recommendation system for providing a recommendation platform specialized in a specific commercial sector, thereby enabling users to communicate with professionals and/or experts of a corresponding field, and being provided with recommendations for digital content related to said field. Therefore, in at least some embodiments of the present technology, it is contemplated that the recommendation system 100 may provide specialized recommended content related to a specific commercial sector such as, without limitation, hotel business, healthcare, human resources and employment, boats and sailing, and so forth.

Electronic Device

The system 100 comprises a plurality of electronic devices 106, each electronic device being associated with a respective user 20. As such, the electronic device 106 can sometimes be referred to as a "client device", "user device" or "client electronic device". It should be noted that the fact that the electronic device 106 is associated with the user 20 does not need to suggest or imply any mode of operation-such as a need to log in, a need to be registered, or the like.

It should be noted that, although only one user 20 associated with a corresponding electronic device 106 is depicted in FIG. 1, it is contemplated that a user 20 associated with an electronic device 106 is a given user from the plurality of users of the system 100, and where each one of the plurality of users 20 can be associated with a respective electronic device 106.

The implementation of the user devices 106 is not particularly limited, but as an example, the user devices 106 may be implemented as a personal computer (desktops, laptops, netbooks, etc.), a wireless communication device (such as a smartphone, a cell phone, a tablet and the like), as well as network equipment (such as routers, switches, and gateways). The user devices 106 comprises hardware and/or software and/or firmware (or a combination thereof), as is known in the art, to execute a recommendation application 107. Generally speaking, the purpose of the recommendation application 107 is to enable the user 20 to receive (or otherwise access) digital content recommendations provided by the system 100 and, more specifically to display an interface of a recommendation platform 112 hosted on a recommendation server 102, as will be described in greater detail herein below.

Figure 2:
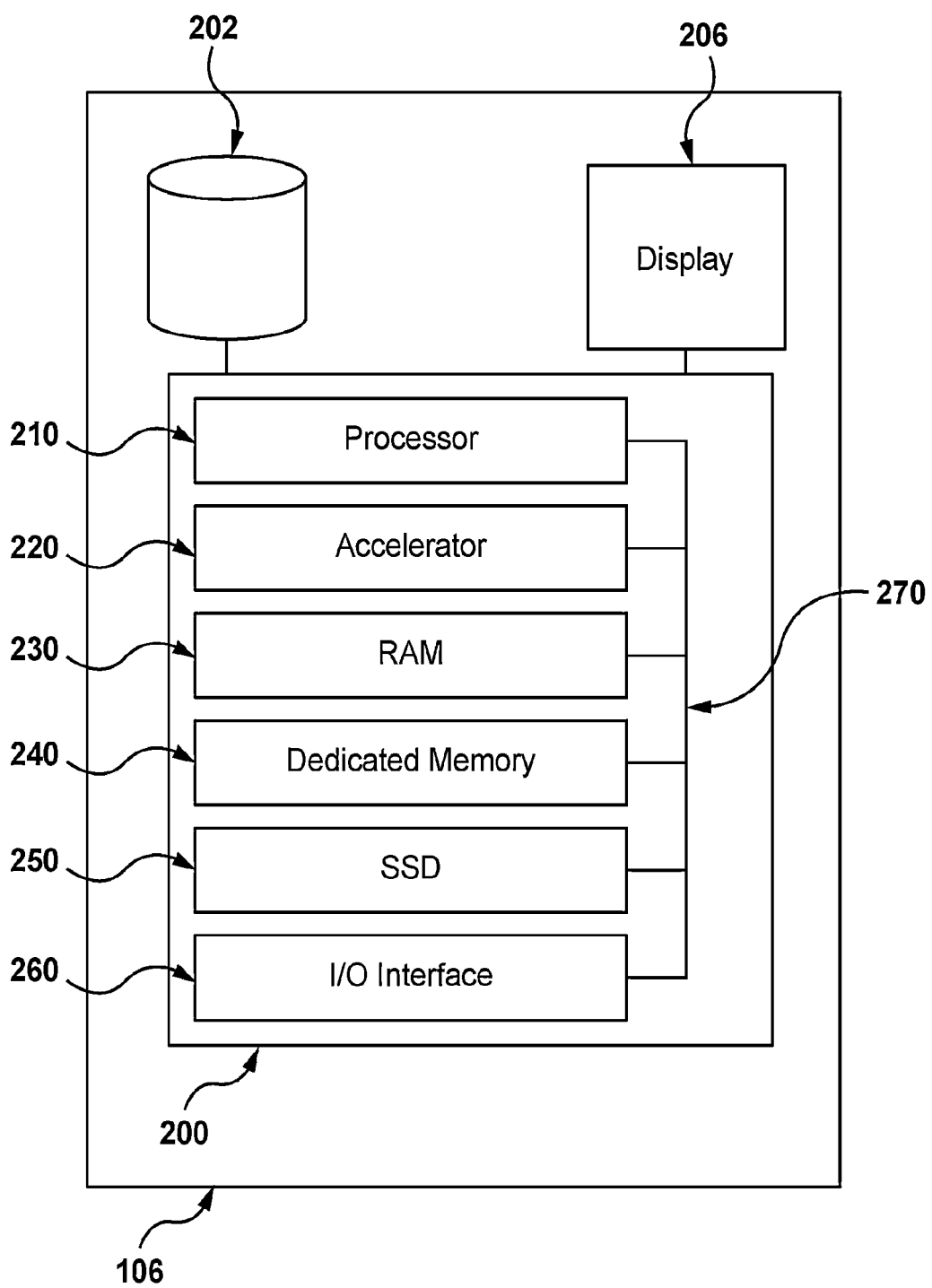
FIG. 2 is a schematic representation of a user device configured for accessing a recommendation platform in accordance with an embodiment of the present technology.

FIG. 2 is a schematic representation of an electronic device 106 that can be implemented in accordance with at least some embodiments of the present technology. The electronic device 106 comprises a computing unit 200. In some embodiments, the computing unit 200 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 200 comprises various hardware components including one or more single or multi-core processors collectively represented by a processor 210, a solid-state drive 250, a RAM 230, a dedicated memory 240 and an input/output interface 260. The computing unit 200 may be a generic computer system.

In some other embodiments, the computing unit 200 may be an "off the shelf" generic computer system. In some embodiments, the computing unit 200 may also be distributed amongst multiple systems. The computing unit 200 may also be specifically dedicated to the implementation of the present technology. As a person in the art of the present technology may appreciate, multiple variations as to how the computing unit 200 is implemented may be envisioned without departing from the scope of the present technology.

Communication between the various components of the computing unit 200 may be enabled by one or more internal and/or external buses 270 (e.g. a PCI bus, universal serial bus, IEEE 1394 "Firewire" bus, SCSI bus, Serial-ATA bus, ARINC bus, etc.), to which the various hardware components are electronically coupled.

The input/output interface 260 may provide networking capabilities such as wired or wireless access. As an example, the input/output interface 260 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 220 stores program instructions suitable for being loaded into the RAM 230 and executed by the processor 210. Although illustrated as a solid-state drive 250, any type of memory may be used in place of the solid-state drive 250, such as a hard disk, optical disk, and/or removable storage media.

The processor 210 may be a general-purpose processor, such as a central processing unit (CPU) or a processor dedicated to a specific purpose, such as a digital signal processor (DSP). In some embodiments, the processor 210 may also rely on an accelerator 220 dedicated to certain given tasks, such as executing the methods set forth in the paragraphs below. In some embodiments, the processor 210 or the accelerator 220 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the electronic device 106 may include a screen or display 206 capable of rendering an interface of the recommendation platform 112. In some embodiments, display 206 may comprise and/or be housed with a touchscreen to permit users to input data via some combination of virtual keyboards, icons, menus, or other Graphical User Interfaces (GUIs). In some embodiments, display 206 may be implemented using a Liquid Crystal Display (LCD) display or a Light Emitting Diode (LED) display, such as an Organic LED (OLED) display. The device may be, for example, an iPhone® from Apple or a Galaxy® from Samsung, or any other mobile device whose features are similar or equivalent to the aforementioned features. The device may be, for example and without being limitative, a handheld computer, a personal digital assistant, a cellular phone, a network device, a smartphone, a navigation device, an e-mail device, a game console, or a combination of two or more of these data processing devices or other data processing devices.

The electronic device 106 may comprise a memory 202 communicably connected to the computing unit 200 and configured to store data, settings of the recommendation application 107, or any other information relevant for running the recommendation application 107 on the electronic device 106. The memory 202 may be embedded in the electronic device 106 as in the illustrated embodiment of FIG. 2 or located in an external physical location. The computing unit 200 may be configured to access a content of the memory 202 via a network (not shown) such as a Local Area Network (LAN) and/or a wireless connexion such as a Wireless Local Area Network (WLAN).

The electronic device 106 may also include a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

Returning to the description of FIG. 1, how the recommendation application 107 is implemented is not particularly limited. One example of the recommendation application 107 may include a given user 20 accessing a web site associated with the recommendation service to access the recommendation application 107. For example, the recommendation application 107 may be accessed by typing in (or otherwise copy-pasting or selecting a link) an URL associated with the recommendation service. Alternatively, the recommendation application 106 may be an application downloaded from a so-called "app store", such as APP-STORE™ or GOOGLEPLAY™ and installed/executed on the electronic device 106. It should be expressly understood that the recommendation application 107 may be accessed using any other suitable means. In yet additional embodiments, the recommendation application 107 functionality may be incorporated into another application, such as a browser application (not depicted) or the like. For example, the recommendation application 107 may be executed as part of the browser application, for example, when the user 20 starts the browser application, the functionality of the recommendation application 107 may be executed.

It should be appreciated that different types of the recommendation application 107 may be transmitted based on the type of electronic device 106. For instance, the smartphone electronic device 106*a* receives an application 107*a* configured to operate on a smartphone while the personal computer electronic device 106*b* receives an application 107*b* configured to operate on a personal computer. In other embodiments, the recommendation application 107 may operate in conjunction with (or be replaced by) a website hosted by the recommendation server 102 enabling a user of the website to access the recommendation platform 112.

Generally speaking, the recommendation application 107 comprises a recommendation interface being displayed on a screen of the electronic device 106. For example, a recommendation interface (not depicted) may be presented/displayed when the user 20 of the electronic device 106 executes (i.e. runs, background-runs or the like) the recommendation application 107. Alternatively, the recommendation interface may be presented/displayed when the user 20 opens a new browser window and/or activates a new tab in the browser application. For example, in some embodiments of the present technology, the recommendation interface may act as a "home screen" in the browser application.

It should be noted that the recommendation interface includes displayed recommended digital content. The displayed recommendable digital content may include a plurality of recommended digital items. Naturally, the recommended digital content may include a large number of recommended digital items. The recommendation interface may allow the user 20 to scroll through the recommended digital items. The scrolling may be achieved by any suitable means. For example, the user 20 can scroll the content of the recommended digital content by means of actuating a mouse device (not depicted), a key board key (not depicted) or interacting with a touch sensitive screen (not depicted) of or associated with the electronic device 106.

As it will be described in greater details herein further below, the plurality of recommended digital items displayed to the user 20 may be organized in a ranked list of recommended digital items. The ranks of respective digital items from this list may be determined based on inter alia user interests of the user 20. In some embodiments, the server 102 may be configured to cause the electronic device 106 to display top ranked digital items from the ranked list of recommended digital items.

In at least some embodiments of the present technology, at least some digital items displayed to the user 20 via the recommendation interface may be displayed with an "interface element" for triggering one or more actions associated with the respective digital item. Actions that can be triggered by the interface element are not particularly limiting. In one non-limiting example, a first interface element associated with a first digital item may be used for triggering display of additional content associated with the first digital item. In an other non-limiting example, a second interface element associated with a second digital item may be used for re-directing the user 20 to a third-party website. The interface elements may take various forms. In some embodiments of the present technology, an interface element may be a button, a clickable picture, clickable text, video, or any other suitable elements that may be interacted with by the user 20 for triggering a corresponding action.

Returning to the description of FIG. 1, the electronic device 106 may be configured to generate a request for digital content recommendation. The request may be generated in response to the user 20 providing an explicit indication of the user desire to receive a digital content recommendation. For example, the recommendation interface may provide a button (or another actuatable element) to enable the user 20 to indicate her/his desire to receive a new or an updated digital content recommendation.

In other embodiments, the request for digital content recommendation may be generated in response to the user 20 providing an implicit indication of the user desire to receive the digital content recommendation. In some embodiments of the present technology, the request for digital content recommendation may be generated in response to the user 20 launching the recommendation application 107.

Alternatively, in those embodiments of the present technology where the recommendation application 107 is implemented as a browser (for example, a GOOGLE™ browser, a YANDEX™ browser, a YAHOO! IM browser or any other proprietary or commercially available browser application), the request for digital content recommendation may be generated in response to the user 20 opening the browser application and may be generated, for example, without the user 20 executing any additional actions other than activating the browser application.

Optionally, the request for digital content recommendation may be generated in response to the user 20 opening a new tab of the already-opened browser application and may be generated, for example, without the user 20 executing any additional actions other than activating the new browser tab.

Therefore, it is contemplated that in some embodiments of the present technology, the request for digital content recommendation may be generated even without the user 20 knowing that the user 20 may be interested in obtaining a digital content recommendation.

Optionally, the request for digital content recommendation may be generated in response to the user 20 selecting a particular element of the browser application and may be generated, for example, without the user 20 executing any additional actions other than selecting/activating the particular element of the browser application.

Examples of the particular element of the browser application include but are not limited to:

an address line of the browser application bar;

a search bar of the browser application and/or a search bar of a search engine web site accessed in the browser application;

an omnibox (combined address and search bar of the browser application);

a favorite or recently visited network resources pane; and any other pre-determined area of the browser application interface or a network resource displayed in the browser application.

How the content for the recommended digital content is generated and provided to the electronic device 106 will be described in greater detail herein further below. It should be appreciated that in other embodiments, the environment 100 can include additional or fewer user devices 106.

Service Provider (SP) Server

Returning to the description of FIG. 1, the system 100 comprises a plurality of servers 108, each server 108 being associated with a respective service provider (SP) 30. As such, the server 108 can sometimes be referred to as a "SP server". Broadly speaking, a given SP may provide services and/or products to users of the recommendation system 100. In some embodiments, in addition to providing services and/or products, a given SP may generate other digital content such as "posts" for users of the recommendation system. Examples of SPs include but are not limited to:

a person providing products or services such as a designer, an electrician, a contractor, an architect, a decorator, a gardener, etc.;

a retailer of furniture, pool supplies, gardening supplies, decorative supplies, household appliances, etc.; and a manufacturer of products, housebuilders, carpenters, real estate developers, etc.

It should be noted that the fact that the SP servers 108 are associated with a SP 30 does not need to suggest or imply any mode of operation-such as a need to log in, a need to be registered, or the like. Each SP server may be associated with a SP electronic device (not depicted) configured to provide access to a corresponding SP server 108 by the corresponding SP 30. The SP electronic device may have similar or equivalent features to the aforementioned electronic devices 106.

It should be noted that, although only one SP 30 associated with a corresponding SP server 108 is depicted in FIG. 1, it is contemplated that a SP 30 associated with a SP server 108 is a given user from the plurality of SP of the system 100, and where each one of the plurality of SP 30 can be associated with a respective SP server 108.

The SP servers 108 may use the application 107 (or a different provider application) to provide information regarding a product and/or service that is the object of recommendations. The SP servers 108 may also use the application 107 to monitor which users 20 are endorsing and/or engaging with their products/services. The SP servers 108 may also use the application 107 to advertise or otherwise incentivize users into referring their products/services.

In at least some embodiments of the present technology, it is contemplated that a given SP may be configured to generate one or more "posts" for users of the recommendation system 100. In some cases, these "posts" may aid the given SP to raise awareness or attract a broader audience to additional digital content that is available on the respective SP server. For example, the given designer may generate a potentially recommendable digital item in a form of a post about a new designer job that (s)he completed, and the respective SP server may host a website associated with the given designer which comprises additional digital content about the designer.

As it will be described in greater details herein further below, the server 102 may be configured to provide one or more SP servers 108 with one or more digital items of potential interest to a given user 20. The SP 20 of a respective SP server 108 may then make use of this information for contacting the given user 20, and/or providing one or more digital items to the given user 20 via the recommendation platform 112. In some cases, the one or more digital items may be included in a pool of potentially recommendable digital items of the recommendation platform 122, while in other cases, a digital item may be "synthesized" for the given user 20 and which is representative of a predicted digital item of interest to the given user 20.

It should be appreciated that in other embodiments, the environment 100 can include additional or fewer SP servers 108.

Communication Network

The electronic devices 106 and the SP servers 108 are communicatively coupled to a communication network 104 for accessing the recommendation server 102 and the recommendation platform 112 hosted thereby. In some non-limiting embodiments of the present technology, the communication network 104 may be implemented as the Internet. In other embodiments of the present technology, the communication network 110 can be implemented differently, such as any wide-area communication network, local-area communication network, a private communication network and the like.

How a communication link (not separately numbered) between the electronic devices 106, the SP servers 108 and the communication network 104 is implemented will depend inter alia on how the electronic device 106 and the SP servers 108 are implemented. Merely as an example and not as a limitation, in those embodiments of the present technology where an electronic device 106 is implemented as a wireless communication device (such as a smartphone), the communication link between said electronic device 106 and the recommendation server 102 can be implemented as a wireless communication link (such as but not limited to, a 3G communication network link, a 4G communication network link, Wireless Fidelity, or WiFi® for short, Bluetooth® and the like). In those examples where one of the electronic device 106 and/or the SP servers 108 is implemented as a notebook computer, the corresponding communication link can be either wireless (such as Wireless Fidelity, or WiFi® for short, Bluetooth® or the like) or wired (such as an Ethernet based connection).

Database

A database 110 is communicatively coupled to the recommendation server 102. The database 110 is depicted as a separate entity from the server 102. However, it is contemplated that the database 110 may be implemented integrally with the server 102, without departing from the scope of the present technology. Alternatively, functionalities of the database 110 as described below may be distributed between more than one physical devices.

Generally speaking, the database 110 is configured to store data generated, retrieved and/or processed by the server 102 for temporary and/or permanent storage thereof. For example, the database 110 may be configured to store inter alia data for training and using one or more machine learning algorithms of the recommendation platform 112. The database 110 may be implemented by any computer-readable medium, including RAM, ROM, flash memory, magnetic or optical disks, optical memory, or other storage media.

Figure 3:
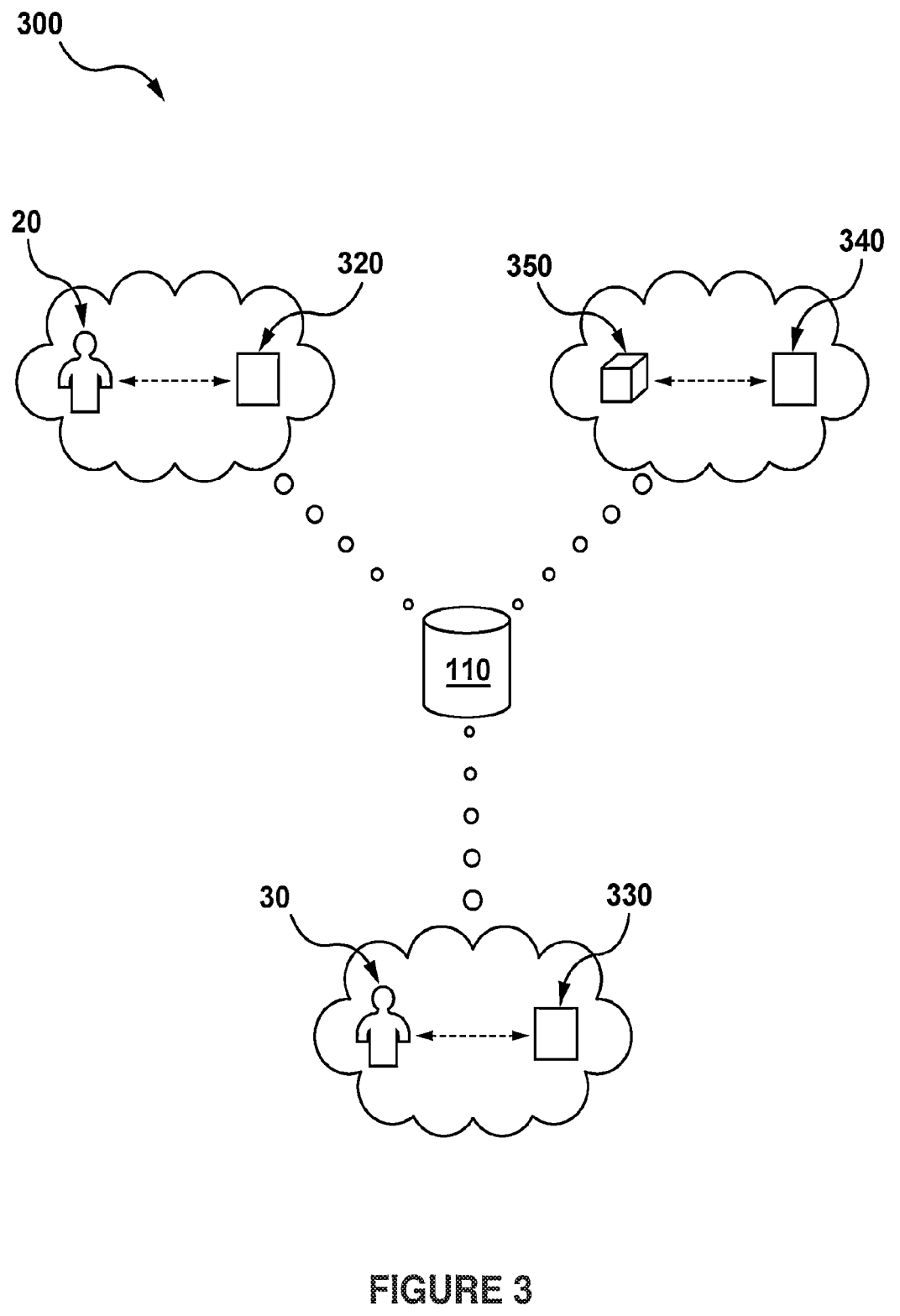

Broadly speaking and with reference to FIG. 3, the database 110 may be configured to store "user data" 320 in association with respective users 20 of the recommendation platform 112, "item data" 340 in association with respective digital items 350 potentially recommendable by the platform 112 to the respective users 20, and "SP data" 330 in association with respective SPs 30. What data can be stored in various embodiments of the present technology in associated with the users 20, the SPs 30, and the digital items 350 will now be described in turn.

The database 110 may be configured to store information associated with respective users 20 of the recommendation platform 112. For example, the server 102 may be configured to collect and store in the database 110 user-profile data associated with respective users of the recommendation platform 112 such as, but not limited to: name, age, gender, geographical location for each user, and other information related to each user.

The database 110 may also be configured to store information about interactions between digital content items and users. For example, the server 102 may track and gather a variety of different user-item interactions between users and previously recommended digital items. Such user data can be said to encompass behavioral data of a respective user 20 with the content provided by the recommendation platform 112.

For example, let it be assumed that a given user 20 interacted with a given digital item being a given digital item previously recommended thereto via the recommendation platform 112. As such, the server 102 may track and gather user-item interaction data of the given user 20 with the given digital item in a form of user events that occurred between the given user 20 and the given digital item. Examples of different types of user events that may be tracked and gathered by the server 102 may include, but are not limited to:

the given user "scrolled over" the given digital item;

the given user "liked" the given digital item;

the given user "disliked" the given digital item;

the given user "shared" the given digital item;

the given user "clicked" or "selected" the given digital item;

the given user spent an amount of "interaction time" consulting the given digital item; and the given user purchased/ordered/downloaded the given digital item.

In at least some embodiments, user data stored in associated with a respective user 20 may further comprise information indicative of a purchase history of the respective user 20, endorsed SPs by respective user 20, personalized user-networks for the respective user 20 (e.g., a set of other users 20 of the recommendation platform 112 with which the respective user 20 is connected), endorsed products/services by the respective user 20, classes and/or types of digital items that the respective user 20 finds of interest, and the like. Other information about the plurality of users of the recommendation service may also be stored in the database 110 as part of the user data 320, without departing from the scope of the present technology.

As it will become apparent from the description herein further below, the server 102 may be configured to store (as part of the user data) in the database 110 one or more user vectors of one or more types associated with respective users of the recommendation platform 112. For example, a user vector for a given user 20 may comprise information indicative of user behavior and/or user interests.

The server 102 may be configured to use one or more machine learning algorithms of the recommendation platform 112 for generating user vectors (of different types) and may then store them in the database 110 for further processing. For example, the server 102 may be configured to generate and store user vectors in off-line mode of the recommendation platform 112, and then retrieve them for further processing during the on-line mode of the recommendation platform 112.

Additionally, or alternatively, the server 102 may generate one or more user vectors by employ a variety of embedding algorithms. Just as examples, one or more embedding algorithms executed by the server 102 may employ computer-implemented techniques such as Singular Value Decomposition (SVD), user profiling for web page filtering, Principal Component Analysis (PCA), and the like. In at least some embodiments, one or more embedding algorithms may be implemented as trained machine learning algorithms. For example, a given embedding algorithm may be implemented via a hidden Markov model, a Recurrent Neural Network (RNN), a Gated Recurrent Unit (GRU), and the like as is known in the art. How the one or more user vectors associated with a respective user 20 are used by the recommendation platform in at least some embodiments of the present technology will be discussed in greater details herein further below.

The database 110 may be configured to store information associated with respective SPs 30 of the recommendation platform 112. For example, the server 102 may be configured to collect and store in the database 110 SP-profile data associated with respective SPs of the recommendation platform 112 such as, but not limited to: name, type of SP, coordinates, geographical location, and other information related to each SP.

The database 110 may also be configured to store information about digital content items associated with a given SP 30. For example, digital items associated with a given SP 30 may comprise digital items representative of products and/or services offered by the given SP 30, as well as one or more posts generated by the given SP 30 in the recommendation platform 112.

In some embodiments of the present technology, the database 110 may also be configured to store information about interactions between SPs and users and/or SPs and digital items in the recommendation platform 112. For example, the server 102 may track and gather a variety of different SP-user interactions between SP and users that previously engaged with the SP and/or SP-item interactions between SP and digital items (such as post of respective users and/or other digital items available for recommendation in the recommendation platform 112).

For example, let it be assumed that a given SP 30 interacted with a given user 20 via the recommendation platform 112. As such, the server 102 may track and gather SP-user interaction data of the given SP 30 with the given user 20 and/or the given digital item in a form of SP 30 events that occurred between the given SP 30 and the given user 20 and/or the given digital item respectively. Examples of different types of SP events that may be tracked and gathered by the server 102 may include, but are not limited to:

the given SP "interacted" with the given user;

the given SP spent an amount of "interaction time" with the given user;

the given SP sent a service offer to the given user;

the given SP received an acceptance of an offer for a service to the given user the given SP "scrolled over" the given digital item;

the given SP "liked" the given digital item;

the given SP "disliked" the given digital item;

the given SP "shared" the given digital item;

the given SP "clicked" or "selected" the given digital item;

the given SP spent an amount of "interaction time" consulting the given digital item; and the given SP purchased/ordered/downloaded the given digital item.

As it will become apparent from the description herein further below, the server 102 may be configured to store (as part of the SP data) in the database 110 one or more SP vectors of one or more types associated with respective SPs of the recommendation platform 112. For example, a SP vector for a given SP 30 may comprise information indicative of products and/or services offered by the given SP 30. The one or more SP vectors may be generated by the server 102 employing one or more machine learning algorithms and/or one or more embedding techniques as described above.

The item data includes information about respective digital items that are potentially recommendable by the recommendation platform 112 of the server 102. For example, the item data 340 for the digital item 350 may include digital content representative of the digital item 350. In at least some embodiments of the present technology, it can be said that the database 110 stores item data 340 for respective digital items 350 from a pool of potentially recommendable digital items by the recommendation system 100 to its users.

As an example, a digital item may comprise textual and/or visual information to be displayed on the recommendation application 107, such as a post, a comment, a picture, a gallery of pictures, a video, a product and/or a service, or any other form of digital item suitable for being recommended by the recommendation platform 112. In one example, a given digital item may be associated with a user, such a user's post. In an other example, a given digital item may be associated with a SP, such as a product and/or service offered thereby, and a post provided thereby.

The nature of digital content that is potentially recommendable by the server 102 is not particularly limited. Some examples of digital content that is potentially recommendable by the server 102 include, but are not limited to, digital items such as:

a picture of a gallery of pictures;

a profile and/or information about one or more SPs;

a product and/or service provided by one or more SPs;

a news article;

a publication;

a web page;

a post on a social media web site.

It is contemplated that the item data of a given digital item may comprise information about actions associated therewith. In some non-limiting embodiments of the present technology, the item data of a digital item may comprise raw textual data from respective digital item. This means that the server 102 may be configured to parse a given digital content item, extract (raw) textual content from that item and store it in association with that item as part of the item data.

Furthermore, the item data 340 may comprise information about one or more item features associated with respective digital content items. For example, the database 110 may store data associated with respective items indicative of, but not limited to:

popularity of the given digital item;

click-through-rate for the given digital item;

time-per-click associated with the given digital item;

purchasing events of the given digital item;

renting events of the given digital item;

sharing events of the given digital item;

other statistical data associated with the given digital item; and others.

In addition to the data non-exhaustively listed immediately above, the database 110 may store metadata associated with a given digital item such as, for example, a description of the digital item (text, images, and/or videos). At least some of the metadata may be acquired by the server 102 (and stored in the database 110) from a third-party server, such as one of the SP servers 108. It is also contemplated that the database 110 may store additional features about a given digital item that have been extracted from the information associated with the given digital item via known techniques. In addition to the data non-exhaustively listed immediately above, the database 110 may include information about interactivity between users and a given digital item. For example, a variety of metrics, such as adoption and/or engagement metrics for the given digital item may be tracked and recorded. In one non-limiting example, the item data 340 associated with the digital item 350 may include information such as which users 20 "scrolled-over", "liked", "shared", "clicked", "purchased" the digital item 350.

The item data of a given digital item may include one or more item vectors comprising information representative of one or more characteristics/features of the corresponding digital item. For instance, the item vector may comprise information indication whether the corresponding digital item is a product or a service, a type of service or product (e.g. carpentry services, electricity work services, furniture products, house, etc.), indication of a price related to the digital item, indication of a SP associated to the digital item, and/or any other indication suitable for recommendation purposes of that digital item.

It should be noted that in the context of the present technology, the user-item interaction data between users and digital content items of the recommendation platform 112 may include "frequent" events and comparatively "rare" events. On the one hand, frequent events refer to events between users and digital content items that typically occur in large numbers and include events such as, for example, a user "liking" or "selecting" a given digital item. On the other hand, rare events refer to events between users and digital content items that occur in comparatively low numbers such as, for example, the purchase of a unique digital item.

To better illustrate this, let's consider an example where a first digital content item is representative of a particular lamp and a second digital content item is representative of a real-estate property such as a particular house. The particular lamp may be one of many of its kind (e.g., duplicable), while the particular house is unique (e.g., non-duplicable). In this example, users of the recommendation system 100 may perform frequent events with both the first digital content item and the second digital content item. These frequent events may represent users "liking" and/or "selecting" the digital item representative of the particular lamp and/or the particular house. There frequent events may also represent "purchases" of the first digital item by a large number of users, since a given SP may sell a large number of these particular lamps to users of the recommendation service 100. However, users of the recommendation system 100 may perform rare events with the second digital content item. These rare events may represent "purchases" of the second digital item by a limited number of users, since a particular house is purchased rarely, generally every few years or so.

It should be noted that in the context of the present technology, the digital items stored in the database 110 may be of different types, including a first type and a second type. Digital items of a first type contain digital items that are associated with a limited number of events of a pre-determined type. For example, digital items of the first type may contain digital items that are associated with a limited number of "purchasing" events and/or a limited number of "renting" events and/or a limited number of events of an other type having been determined by an operator of the recommendation system 100.

It is contemplated that the digital items of the first type may contain digital items that are representative of unique products and/or services. For example, digital items of a first type may comprise digital items representative of unique real-estate properties. Digital items of a second type contain digital items that are associated with a large number of events of a pre-determined type. For example, digital items of the second type may contain digital items that are associated with a large number of "purchasing" events and/or a large number of "renting" events and/or a large number of events of the other type having been determined by the operator of the recommendation system 100. It is contemplated that the digital items of the second type may contain digital items that are representative of serially produced products and/or non-unique services.

In at least some embodiments of the present technology, the server 102 may be configured to compare a current number of events of the pre-determined type associated with a given digital item to a threshold number of events of the pre-determined type.

In at least some embodiments of the present technology, the server 102 may be configured to group digital content items into distinct group types. For example, the server 102 may be configured to identify the pre-determined type of events (e.g., "purchasing" events) and may compare a current number of events of that type associated with a given digital item to a threshold number of events of that type-if the current number is below the threshold number, the server 102 may classify the given digital item as being of a first type, or otherwise as being of a second type.

In further embodiments of the present technology, the server 102 may be configured to access event data associated with digital items in the database 110. The server 102 may be configured to identify a pre-determined type of event, and verify a current number of events of the pre-determined type associated with respective digital items in the database 110 against a threshold number. In response to the current number being above or below the threshold number, the server 112 may be configured to classify the given digital item as being of a first type or the second type, for example. This classification process may be executed for respective digital items stored in the database 110. The server 112 may then trigger storage of the digital items of a first type as a first group of digital items in the database 110. The server 112 may also trigger storage of the digital items of a second type as a second group of digital items in the database 110.

In a further embodiment of the present technology, the threshold number of events may have been determined in a similar manner to what is disclosed in an article entitled "*On the prediction performance of the Lasso*", authored by Arnak S. Dalalyan et al., published on Nov. 8, 2016, the contents of which is incorporated herein by reference in its entirety. In some embodiments of the present technology, the threshold number of events may depend on a number of events of a pre-determined type and/or a number of dimensions of an item vector associated with the given digital item.

In another embodiment of the present technology, it is contemplated that frequent events may be events that occur at a frequency ratio that is above a threshold frequency ratio. The frequency ratio may be defined as a number of events of a pre-determined type (e.g., purchasing events) performed by users on a given digital content item over a number of times that users have been presented with an indication of the event of a pre-determined type having been performed on the given digital content item. For example, let it be assumed that a given digital item has been purchased once, and an indication of the purchase of the given digital item has been presented to users fifteen times. In this example, the frequency ratio is 1/15.

In these embodiments, the threshold frequency ratio may be defined as:

$$R_{TH} = C \left( 1 - \left( \frac{n}{N} \right) \right)^{-1} * \frac{1}{N} * \sqrt{(n)/\log(p)}$$

where n is a number of events of a pre-determined type performed by users on a given digital item, N is a number of times that users have been presented with an indication of the event of a pre-determined type having been performed on the given digital content item, p is a number of dimensions of a given item vector associated with the given digital item, and C is a constant selectable by an operator of the recommendation system. It at least some embodiments, it can be said that the threshold ratio $R_{th}$ may be a function of (i) a number of events of a pre-determined type performed by users on a given digital item, (ii) a number of times that users have been presented with an indication of the event of a pre-determined type having been performed on the given digital content item, and (iii) a number of dimensions of a given item vector associated with the given digital item.

In some embodiments, it is contemplated that if a current ratio n/N for a given digital item is below the threshold ratio $R_{th}$, the server 102 may be configured to classify the given digital item as a digital content item of a first type. Additionally or optionally, if a current ratio n/N for a given digital item is above the threshold ratio $R_{th}$, the server 102 may be configured to classify the given digital item as a digital content item of a second type.

The server 102 may provide recommendation content including digital items of the first type and digital items of the second type. However, as it will be described in greater details herein further below, developers of the present technology have realized that predicting a digital item of the first type for a given user, and then using the information regarding a predicted digital item of the first type during generation of recommended content comprising items of the second type may reduce the dimensionality of the recommendation problem and thus rank recommended content based on a more accurate estimation of likelihood of interaction with that content.

Recommendation Server

Returning to the description of FIG. 1, the server 102 may be implemented as a conventional computer server. In an example of an embodiment of the present technology, the server 102 may be implemented as a Dell™ PowerEdge™ Server running the Microsoft™ Windows Server™ operating system. Needless to say, the server 102 may be implemented in any other suitable hardware, software, and/or firmware, or a combination thereof. In the depicted non-limiting embodiments of the present technology, the server 102 is a single server. In alternative non-limiting embodiments of the present technology, the functionality of the server 102 may be distributed and may be implemented via multiple servers.

Generally speaking, the server 102 is configured to (i) receive from an electronic device 106 request for digital item recommendation from a given user and (ii) responsive to the request 150, generate a ranked list of recommendable digital items based on inter alia user data of the given user to be transmitted to the electronic device 106.

The server 102 includes one or more processors configured to manage access and interaction of the users and/or SPs with the recommendation platform 112. In order to ease an understanding of the present disclosure, each of the one or more processors of the server 102 is associated with one or more functions but said functions may be performed by a single processor or a different number of processors in alternative embodiments. This aspect is not limitative.

For example, in this embodiment, the server 102 comprises a digital feed generation processor 120, and a digital content recommendation processor 130. For example, the digital content recommendation processor 130 may be configured to employ a recommendation engine 402 hosted by the server 102 for generating recommended digital content for a given user of the recommendation system 100. The digital feed generation processor 120 may be configured to make use of the information generated by the recommendation engine 402 (such as digital content to be recommended) for generating one or more data packets to be transmitted via the communication network 104 to the electronic device 106 of the given user. The one or more data packets may be indicative of inter alia (i) the recommended digital content for the given user, and (ii) instructions for rendering the recommendation interface with the recommended digital content on the respective electronic device 106.

How the recommendation engine 140 is implemented in at least some embodiments of the present technology, and how the server 102 may make use of the recommendation engine 402 for recommending digital content to the users 20 of the recommendation system 100 will now be described in greater details.

Recommendation Engine

Figure 4:
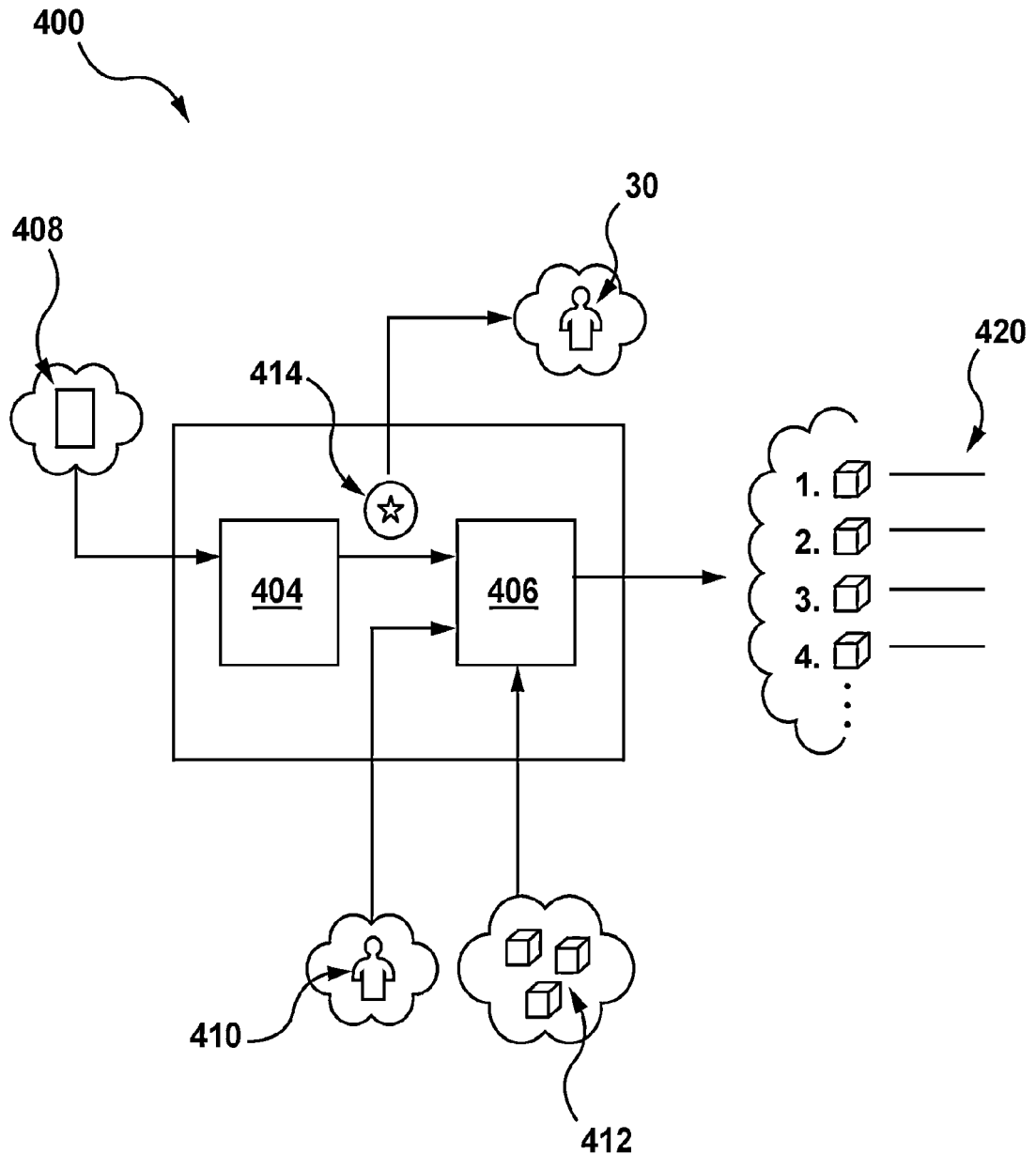
FIG. 4 depicts a representation of a recommendation engine of the recommendation environment of FIG. 1 in accordance with non-limiting embodiments of the present technology.

In FIG. 4 there is depicted the recommendation engine 402 configured to generate a ranked list of content items 420 for a given user 20 and/or provide an output 414 to the service provider 30. More particularly, the recommendation engine 402 makes use of user data associated with the user 20 (first user data 408 and second user data 410) and item data 412 associated with digital content items to be ranked for generating the ranked list 420.

The recommendation engine 402 comprises a first model 404 and a second model 406 that can be implemented as respective machine learning algorithms. Machine learning algorithms are commonly used as embedding models, estimation models, ranking models, classification models, prediction models and the like. It should be understood that different types of the machine learning algorithms having different structures or topologies may be used for various tasks.

One particular type of machine learning algorithms includes Neural Networks (NNs). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than trying to determine complex statistical arrangements or mathematical algorithms for a given situation: the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers, automatic text translation into different languages, data processing, including filtering, clustering, vector embedding, and the like.

In some cases, machine learning algorithms can be used for performing generative modeling. Broadly speaking, generative modeling is an unsupervised learning task in machine learning that involves automatically discovering and learning the regularities or patterns in input data in such a way that the model can be used to generate or output new examples that plausibly could have been drawn from the original dataset. During the training process, a large collection of data in a particular domain can be gathered (e.g., images, sentences, sounds, vectors, etc.) and can be used to train a generative model to generate or synthesize data like it.

For example, Generative Adversarial Networks (GANs) use a technique for training a generative model by framing the problem, in a sense. as a supervised learning problem with two sub-models: the generator model that is trained to generate new examples, and the discriminator model that tries to classify examples as either "real" (from the domain) or "fake" (generated). The two models are trained together in a zero-sum game, adversarial, until the discriminator model is fooled about half the time, meaning the generator model is generating plausible examples.

To summarize, the implementation of the first model 404 and the second model 406 by the server 102 can be broadly categorized into two phases-a training phase and an in-use phase. First, the respective ones of the first model 404 and the second model 406 are trained in their training phases. As it will be discussed in detail below, the training of the first model 404 may be performed in a supervised or an unsupervised manner depending on inter alia different implementations of the present technology. Then, once the first model 404 and the second model 406 know what data to expect as inputs and what data to provide as outputs, the respective ones of the first model 404 and the second model 406 are actually run using in-use data in the in-use phase.

How the first model 404 is trained, how the second model 406 is trained, and how the first model 404 and the second model 406 are then used during their in-use phase will now be described in turn.

First Model

Figure 5:
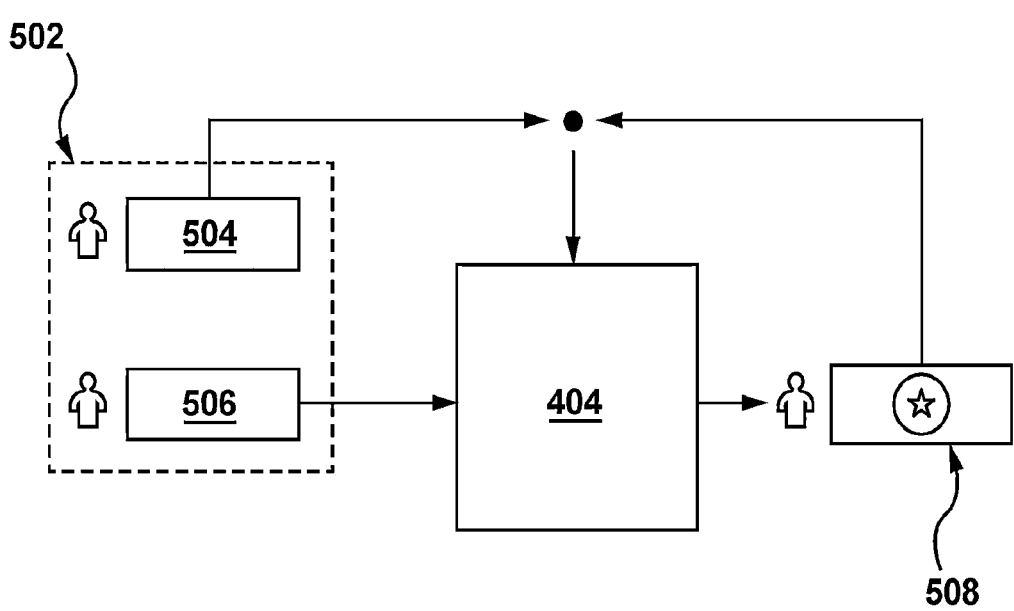
FIG. 5 depicts a representation of a single training iteration of a first model of the recommendation engine of FIG. 4 in accordance with non-limiting embodiments of the present technology.

With reference to FIG. 5, there is depicted a representation 500 of a single training iteration of the first model 404. In at least some embodiments of the present technology, the server 102 may be configured to generate a plurality of training sets (not depicted) including a training set 502 that is used during the single training iteration of the first model 404.

In some embodiments of the present technology, the first model 404 may be embodied as a matrix factorization model configured to receive embeddings for users and content items. Generally, a matrix factorization model is a class of collaborative filtering algorithms used in recommendation systems and which operate by decomposing a user-item interaction matrix into the product of two, lower dimensionality, matrices.

Broadly speaking, given a matrix A where m is a number of users and n is a number of items, the model learns a user embedding matrix U, where row i is the embedding for user i, and an item embedding matrix V', where row j is the embedding for item j. The embeddings are learned such that the product $UV^T$ is a good approximation of the matrix A. In some cases, an objective function to be minimized may be a sum of squared errors over pairs of observed entries. In other cases, an objective function to be minimizing is a squared Frobenius distance between A and its approximation $UV^T$. This quadratic problem can be solved through Singular Value Decomposition (SVD) of the matrix, for example. In other cases, a weighted matrix factorization technique may be used and which decomposes the objective into a sum over observed entries and a sum over unobserved entries. Minimization of the object function may take different forms. In some embodiments, a Stochastic Gradient Descent (SGD) algorithm may be executed by the server 102 for minimizing the loss function. In other embodiments, a Weighted Alternating Least Squares (WALS) algorithm may be executed by the server for minimizing the loss function. The server 102 may be configured to execute the WALS algorithm by initializing the embeddings randomly, then alternating between, fixing (and solving for V. and then fixing V and solving for U, and so forth.

The server 102 may be configured to access user data associated with users of the recommendation platform 102 and identify one or more users that have performed a rare event on a given item of the first type.

For example, the server 102 may be configured to identify a subset of users that have purchased respective real-estate properties on the recommendation platform 112. As such, for a given user from the subset of users, the server 102 may be configured to generate the training set 502 having a user vector 506 and a respective ground-truth vector 504. In this example, the server 102 may be configured to generate the user vector 506 based on the user data associated with the given user in the database 110 and/or retrieve a previously-stored user vector associated with the given user from the database 110.

The server 102 is configured to generate the ground-truth vector 504 based on the item data associated with the given item of the first type on which the given user performed a rare event (e.g., purchasing event) and/or retrieve a previously-stored item vector associated with the given item of the first type in the database 110.

Hence, the training set 502 comprises (i) the user vector 506 associated with a given user representing in a sense "frequent events" performed by the given user on digital items (e.g., behavioral data associated with the given user) and the ground-truth vector 504 representing a given item of the first type on which the given user performed a rare event (e.g., representing a real-estate property that the given user actually purchased).

The server 106 is configured to input the user vector 506 into the first model 404 that is configured to generate an output vector 508. The output vector 508 is representative of a predicted digital item of the first type on which the given user is likely to perform a rare event. The server 106 is configured to compare the ground-truth vector 504 against the output vector 508 (ground truth vs. prediction) in order to generate a penalty score 510 for the current training iteration.

How the penalty score 510 is generated based on a comparison of the ground-truth vector 504 against the output vector 508 the not particularly limited. However, in at least some implementations of the present technology, the penalty score 510 can be based on a distance between the ground-truth vector 504 and the output vector 508.

It should be noted that the server 102 is configured to use the penalty score 510 in order to adjust the first model 404 such that the first model 404 in a sense "learns" from the given training set and generates predicted outputs that are closer to the ground-truth. In this way, the first model 404 is configured to learn, with each such iteration, to generate output vectors representative of predicted digital items of the first type that are similar to actual digital items of the first type on which the users previously performed a rare event.

It should be noted that in other embodiments of the present technology, the server 102 may employ a generative model for generating output vectors representative of the predicted digital item of the first type on which the given user is likely to perform a rare event. The server 102 may be configured to train the generative model in an unsupervised manner.

In at least some embodiments of the present technology, the server 102 may be configured to employ at least one of a Naive Bayes classifying generative model, a Latent Dirichlet Allocation (LDA) generative model, and a Generative Adversarial Network (GAN), as the generative model discussed herein. In further embodiments, the server 102 may be configured to train an autoencoder-type model with unsupervised learning techniques.

Broadly, the GAN modeling framework can be applied on models such as multilayer perceptrons. To learn a generator's distribution $p_g$ over data x, a prior on input noise variables $p_z(z)$ can be defined, and can represent a mapping to data space as $G(z: \theta_g)$, where G is a differentiable function represented by a multilayer perceptron with parameters $\theta_g$. A second multilayer perceptron $D(x; \theta_d)$ can be defined and that outputs a single scalar. $D(x)$ represents the probability that x came from the data rather than $p_g$. D can be trained to maximize the probability of assigning the correct label to both training examples and samples from G. G can be simultaneously trained to minimize $\log(1-D(G(z)))$.

It is contemplated that the generative model may be embodied as a transformer network without departing from the scope of the present technology. The Generative Adversarial Transformer (GAT) is a type of GAN, which involves a generator network G that maps random samples from the latent space to the output space, and a discriminator network D which seeks to discern between real and fake samples. The two networks compete with each other through a minimax game until reaching an equilibrium. Typically, each of these networks consists of multiple layers of convolution, but in the GAT case, the networks are constructed using an architecture called Bipartite Transformer.

In at least some embodiments of the present technology, the server 102 may be configured to use the first model 404 for generating an indication of a predicted digital item of a first type (on which the given user is likely to perform a rare event) from a "real" domain and/or from a "possible" domain.

In one example, during in-use, the first model 404 may be configured to generate an output vector and compare it against item vectors of digital items of the first type that are stored in the database 110 and select a given digital item of the first type that has the closest item vector to the output vector generated by the first model 404. In this example, it can be said that the server 102 may make use of the first model 404 in order to select an actual (real) digital item of the first type that is available on the recommendation platform 112 and on which the give user is likely to perform a rare event.

In another example, during in-use, the first model 404 may be configured to generate an output vector that is representative of a "synthesized" digital item of the first type this is not necessarily available on the recommendation platform 112. In this example, it can be said that the server 102 may make use of the first model 404 in order to generate a synthesized (possible) digital item of the first type on which the given user is likely to perform a rare event if the synthesize digital item was available on the recommendation platform 112.

Developers of the present technology have realized that generation of the synthesized digital item of a first type may be beneficial for reducing the dimensionality of the recommendation problem during the in-use phase of the platform for some users that have not necessarily performed rare events on digital items of a first type in the recommendation system.

Furthermore, developers of the present technology have also realized that generating synthesized digital items of the first type for respective users may allow generation of new synthetic training examples for training the second model 406 and/or other ranking models. As it will be described in greater details herein further below, during training of the second model 406, additional synthetic training examples may be generated for increasing a total number of training examples available for training the second model 406. Developers of the present technology have realized that increasing an amount of training data available to train the second model 406 may be beneficial for increasing the performance of the second model 406.

Second Model

Figure 6:
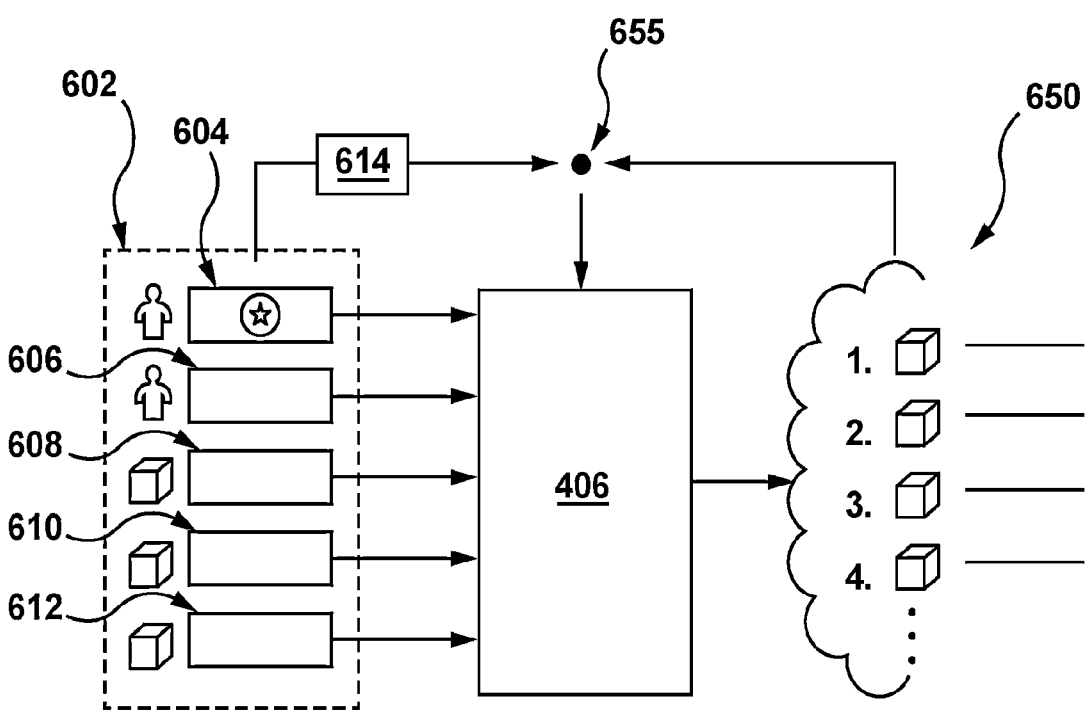
FIG. 6 depicts a representation of a single training iteration of a second model of the recommendation engine of FIG. 4 in accordance with non-limiting embodiments of the present technology.

With reference to FIG. 6, there is depicted a representation 600 of a single training iteration of the second model 406. In at least some embodiments of the present technology, the server 102 may be configured to generate a plurality of training sets (not depicted) including a training set 602.

In some embodiments of the present technology, the second model 406 may be implemented similarly to what is disclosed in an article entitled "Recommendation Engine using Collaborative Filtering & product propensity estimation", authored by Jubin Mohanty, the contents of which is incorporated herein by reference in its entirety.

In other embodiments of the present technology, the second model 406 may be implemented similarly to what is disclosed in an article entitled "Recommendation systems: Principles, methods and evaluation", authored by F. O. Isinkaye, Y. O. Folajimi, B. A. Ojokoh, published in 2015, the contents of which is incorporated herein by reference in its entirety.

In some embodiments, the second model 406 may be implemented as a matrix factorization model as described above. In other embodiments, the second model 406 may be implemented as a Deep Neural Network (DNN). For example, a DNN model may use a softmax function that treats the problem as a multi-class prediction where: input is a user vector containing dense features and sparse features, and an output is a probability vector containing items and represents the probability of interaction with each item. For example, a two-tower NN can be executed by the server 102 in which the model learns a non-linear function that maps features to an embedding. Developers of the present technology have realized that this architecture may be flexible enough to handle hidden layers and activation functions such as RELU, which enables the model to capture more complex relationships.

The server 102 is configured to access item data associated with a plurality of digital items. For example, the server 102 may be configured to retrieve and/or generate inter alia item vectors 608, 610 and 612 for respective digital items. In some embodiments, it is contemplated that the training set 602 may include item vectors for digital items with which the given user previous interacted on the recommendation platform 112. In other embodiments, it is contemplated that the training set 602 may include item vectors for digital items of the second type.

The server 102 may also be configured to retrieve and/or generate a user vector 606 for a given user. The user vector

606 may be generated based on user data associated with the given user and previously stored in the database 110. In some embodiments, it is contemplated that the user vector 606 may be generated based on most recent user data associated with the given user. For example, the user vector 606 may be generated for the given user based on user interaction data associated with the given user that has been collected in a most recent pre-determined time period. The time period may be pre-determined by the operator of the recommendation platform 112.

The server 102 may also employ the (now trained) first model 404 for generating a vector 604 based on the user data associated with given user. For example, the first model 404 may generate a given output vector and identify a given item vector associated with a digital item of the first type that is closest to the given output vector.

In another example, the vector 604 may be the output vector generated by the first model 404 based on the user data associated with the given user. Recalling that the output vector generated by the first model 404 is representative of a synthesized digital content item of the first type, the first model 404 may be employed for injecting additional synthetic training examples into the training process of the second model 406. In other words, the server 102 may be configured to generate additional synthetic training examples for users that have not performed events of a pre-determined type on digital items of the first type, and where the lacking information is substituted by the output vector of the first model 404, and which output vector is a prediction of a synthesized digital content item of the first type on which this user is likely to perform an event of a pre-determined type. Developers have realized that this allows mitigating a problem of limited availability of training data that is rooted in compute-implemented technologies.

The server 102 is configured to input into the second model 406 during the given training iteration the vector 604 representative of a predicted digital item of the first type on which the given user is likely to perform a rare event, the user vector 606, and item vectors associated with the plurality of digital items to be ranked, including the item vectors 608, 610, and 612. The second model 406 is configured to output a ranked list of items 650.

The server 106 is configured to compare the ranked list of items 650 against label data 614 of the training set 602. The label data 614 is based on previous user interaction data between the plurality of items to be ranked by the second model 406 and the given user. It is contemplated that the plurality of items to be ranked by the second model 406 may comprise items with which the given user has previously interacted. The server 102 may be configured to access the database 110 for retrieving the label data 614.

It should be noted that the server 102 may employ the label data 614 for training the second model 406 to perform ranking of digital items in the plurality of digital items in a pairwise manner. In other embodiments, the server 102 may employ the label data 614 for training the second model 406 to perform ranking of digital items in the plurality of digital items in a listwise manner.

Irrespective of a specific manner in which the server 102 generates a penalty score 655 based on a comparison of the label data 614 against data from the ranked list of digital items 650, the server 102 may be configured to use the penalty score 655 for adjusting the second model 406 such that, when the second model 406 is employed to rank digital items, a rank of a given item in a ranked list of items generated by the second model 406 is indicative of a likelihood of that the given user interacts with the given item if the given user is likely to perform a rare event on a given predicted digital item of the first type represented by the vector 604.

It should be noted that including the vector 604 (representative of a predicted digital item of the first type on which the given user is likely to perform a rare event) into the training set 602 allows reducing the dimensionality of the recommendation problem. Reduction of the dimensionality of the recommendation problem results in the second model 406 being able to determine with more accuracy a likelihood of that the given user interacts with a given item and, in turn, generate a more accurate ranked list of items based on the respective likelihoods of interaction of the given user with the digital items in the ranked list.

Returning to the description of FIG. 4, once the first model 404 and the second model 406 are trained, the server 106 is configured to employ them during the in-use phase. During a given in-use phase, the server 102 may be configured to acquire the first user data 408 for a given user. The first user data 408 may be in a form of a given user vector generated for the given user based on frequent events performed by the given user on digital items in the recommendation platform 112. It is contemplated that the given user vector (representing the first user data 408) may be generated/retrieved in a similar manner to how the server 102 is configured to generate/retrieve the user vector 506.

The server 102 is configured to input the first user data 408 into the first model 404 that, in response, generates the output vector 414. As explained above, the output vector 414 is representative of a predicted digital item of the first type on which the given user is likely to perform a rare event.

In some embodiments, the output vector 414 may be provided to one or more SPs 30. Information representative of a predicted digital item of the first type on which the given user is likely to perform a rare event may be used by the SPs 30 for providing the given user with digital content in the recommendation platform 112 which is likely to be relevant to the given user if the given user performs the rare event of the predicted digital item.

In other embodiments, the server 102 may use the output vector 414 as an input into the second model 406 of the recommendation engine 402. In these embodiments, the output vector 414 may be used to inject information about a synthesized digital item of the first type into the second model 406 for increasing the quality of prediction of the second model 406 for the respective user. Alternatively, the server 102 may identify an actual digital item of the first type that is most similar to the predicted digital item of the first type by comparing item vectors representative of one or more actual digital items of the first type in the database 110 against the output vector 414. In this embodiment, the server 102 may use the item vector of the most similar actual digital item of the first type as an input into the second model 406.

The server 102 is also configured to acquire the second user data 410 associated with the given user. The second user data 410 may be in a form of an other given user vector generated for the given user based on user data associated with the given user. It is contemplated that the other given user vector (representing the second user data 410) may be generated/retrieved in a similar manner to how the server 102 is configured to generate/retrieve the user vector 606. The server 102 is configured to provide the second user data 410 as an input into the second model 406.

The server 102 is also configured to acquire the item data 412 associated with a plurality of digital items to be ranked for the given user. The item 412 may be in a form of a plurality of item vectors generated for respective items from the plurality of digital items based on item data associated with the respective items and which is stored in the database 110. It is contemplated that the other given user vector. It is contemplated that the plurality of item vectors (representing the item data 412) may be generated/retrieved in a similar manner to how the server 102 is configured to generate/retrieve the item vectors 608, 610, and 612. The server 102 is configured to provide the item data 412 as an input into the second model 406.

In response to the inputs, the second model 406 is configured to generate the ranked list 420. The server 102 is configured to use the ranked list 420 in order to recommend one or more digital content items from the ranked list 420 to the given user. The server 102 may generate a recommended set of items for the given user based on the ranked list 420. In some embodiments, the recommended set of items may include top-N ranked items in the ranked list 420. In other embodiments, the server 102 may select one or more items from the ranked list 420 for inclusion into the recommended set of items.

In some embodiments of the present technology, the server 102 may be configured to execute a method 700 depicted in FIG. 7. Various steps of the method 700 will now be discussed in greater details.

Step 702: Acquiring a Request for Providing the Content to the User

The method 700 begins at step 702 with the server 102 may acquire a request for digital content recommendation from the electronic device 106. The electronic device 106 may be configured to generate the request in response to the user 20 providing an explicit indication of the user desire to receive a digital content recommendation. For example, the recommendation interface may provide a button (or another actuatable element) to enable the user 20 to indicate her/his desire to receive a new or an updated digital content recommendation.

In other embodiments, the request for digital content recommendation may be generated in response to the user 20 providing an implicit indication of the user desire to receive the digital content recommendation. In some embodiments of the present technology, the request for digital content recommendation may be generated in response to the user 20 launching the recommendation application 107.

Alternatively, in those embodiments of the present technology where the recommendation application 107 is implemented as a browser (for example, a GOOGLE™ browser, a YANDEX™ browser, a YAHOO! IM browser or any other proprietary or commercially available browser application), the request for digital content recommendation may be generated in response to the user 20 opening the browser application and may be generated, for example, without the user 20 executing any additional actions other than activating the browser application.

Step 704: Acquiring User Data Associated with the User Indicative of Previous User Interactions of the User with Content Items of the Recommendation System The method continues to step 704 with the server 102 configured to acquired user data associated with the user 20 (associated with the request). The user data is indicative of previous user interactions of the user 20 with content items of the recommendation system 108.

For example, the server 102 may retrieve the user data from the database 110. The server 102 may track and gather a variety of different user-item interactions between users and previously recommended digital items. Such user data can be said to encompass behavioral data of a respective user 20 with the content provided by the recommendation platform 112.

For example, let it be assumed that a given user 20 interacted with a given digital item being a given digital item previously recommended thereto via the recommendation platform 112. As such, the server 102 may track and gather user-item interaction data of the given user 20 with the given digital item in a form of user events that occurred between the given user 20 and the given digital item.

In at least some embodiments, user data stored in association with a respective user 20 may further comprise information indicative of a purchase history of the respective user 20, endorsed SPs by respective user 20, personalized user-networks for the respective user 20 (e.g., a set of other users 20 of the recommendation platform 112 with which the respective user 20 is connected), endorsed products/services by the respective user 20, classes and/or types of digital items that the respective user 20 finds of interest, and the like. Other information about the plurality of users of the recommendation service may also be stored in the database 110 as part of the user data 320, without departing from the scope of the present technology.

Step 706: Generating, Using a First Model, a First Output for the User Based on the User Data, the First Output being Representative of a Synthesized Content Item of a First Type The method 700 continues to step 706 with the server 102 configured to generating, using the first model 404, the first output 414 for the user 20 based on the user data. The first output 414 is representative of a predicted content item of a first type.

In at least some embodiments of the present technology, the first model may be a generative model. In these embodiments, the first output may a generative output of the first model and which is representative of a synthesized content item of the first type.

In some embodiments of the present technology, the content items of the first type in recommendation system may exclude the predicted content item of the first type that the first model may generate.

In one embodiment, the content items of the first type may be unique content items. In further embodiments, the content items of the first type may be non-duplicable content items. In yet an other embodiment, the content items of the first type may correspond to real-estate properties.

Step 708: Acquiring Item Data Associated with a Plurality of Content Items of a Second Type The method 700 continues to step 708 with the server configured to acquire item data 412 associated with a plurality of content items of a second type. The item 412 may be in a form of a plurality of item vectors generated for respective items from the plurality of digital items based on item data associated with the respective items and which is stored in the database 110. It is contemplated that the other given user vector. It is contemplated that the plurality of item vectors (representing the item data 412) may be generated/ retrieved in a similar manner to how the server 102 is configured to generate/retrieve the item vectors 608, 610, and 612. The server 102 is configured to provide the item data 412 as an input into the second model 406.

In at least some embodiments of the present technology, the content items of the second type may correspond to serially produced content items.

Step 710: Ranking, by the Server Using a Second Model, the Content Items of the Second Type into a Ranked List Based on the First Output, the User Data, and the Item Data The method 700 continues to step 710 with the server 102 configured to rank using the second model 406 the content items of the second type into a ranked list based on the first output 414, the user data, and the item data 412.

In response to the inputs, the second model 406 is configured to generate the ranked list 420. The server 102 is configured to use the ranked list 420 in order to recommend one or more digital content items from the ranked list 420 to the given user.

In some embodiments of the present technology, the server 102 may also acquire item data associated with a plurality of content items of the first type (from the database 110, for example). In this case. The server 102 may rank the plurality of content items of the first type and the plurality of content items of the second type into the ranked list of content items.

Step 712: Selecting a Set of Content Items from the Ranked List of Content Items as the Content for the User The method 700 continues to step 712 with the server configured to select a set of content items from the ranked list of content items as the content for the user 20. For example, the server 102 may generate a recommended set of items for the given user based on the ranked list 420. In some embodiments, the recommended set of items may include top-N ranked items in the ranked list 420. In other embodiments, the server 102 may select one or more items from the ranked list 420 for inclusion into the recommended set of items.

In some embodiments, the server may be configured to exclude from the set of content items at least one content item in the ranked list of content items. In these embodiments, the server may determine a similarity score of an other content item in the ranked list with the at least one content item, and where the other content item is ranked above the at least one content item. In this case, if the similarity score is above a pre-determined threshold, the server may exclude the at least one content item from the set of content items.

Step 714: Transmitting the Content for Display to the User in the Application The method 700 continues to step 714 with the server 102 configured to transmit the content for display to the user 20 in the application running on the electronic device 106. The transmission of the set of content items may be performed via one or more data packets sent over the communication network 104.

In at least some embodiments of the present technology, the server 102 may also be configured to execute a method of generating a synthetic training dataset for training a ranking model, such as the second model 406, for example. As part of this method, the server 102 may be configured to classify content items from a pool of content items into a first set of content items of a first type and a second set of content items of a second type. During the classification process, the server 102 may be configured to compare a current frequency ratio associated with a given content item from the pool of content items against a threshold ratio. The frequency ratio associated with the given content item may be a number of events performed by users of a recommendation system on the given content item over a number of times the given content item has been presented to users of the recommendation system. It is contemplated that the server 102 may repeat the classification process periodically based on the then available information stored in the database 110. At a next step of this method, the server 102 may be configured to generate using a first model an output indicative of a synthesized content item of a first type for a given user based on user data. For example, the server 102 may use a generative model for generating the output indicative of the synthesized content item. It is contemplated that the server 102 may use a model that is implemented similarly to how the first model 404 is implemented for generating an output indicative of the synthesized content item on which a given user is likely to perform an event of a pre-determined type. As part of the method, the server 102 may be configured to generate a synthetic training dataset for the ranking model using information about the given user, the output indicative of the synthesized digital item of the first type, information about a set of digital items of the second type to be ranked, and a label indicative of user interactions between the given user and the set of digital items of the second type. Additionally, the training dataset may further comprise a set of digital items of the first type to be ranked in addition to the set of digital items of the second type to be ranked.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of generating content for a user, the content to be displayed by an electronic device executing an application, the electronic device being communicatively coupled to a server by a communication network, the server hosting a recommendation system, the method executable by the server, the method comprising:
   acquiring, by the server from the electronic device over the communication network, a request for providing the content to the user;
   acquiring, by the server, user data associated with the user indicative of previous user interactions of the user with content items of the recommendation system;
   generating, by the server using a first model, a first output for the user based on the user data, the first output being representative of a synthesized content item of a first type,
      content items of the first type having a frequency ratio below a threshold ratio, the frequency ratio being a number of events of a pre-determined type that have been performed on a given content item by users of the recommendation system over a number of times that users have been presented with an indication of the events of the pre-determined type having been performed on the given content item;
   acquiring, by the server, item data associated with a plurality of content items of a second type, the first type being distinct from the second type, content items of the second type having a frequency ratio above the threshold ratio;

ranking, by the server using a second model, the content items of the second type into a ranked list based on the first output, the user data, and the item data,
      a rank of a given content item of the second type being indicative of a likelihood of that the user interacts with the given content item of the second type if the user performs an event of the pre-determined type on the given content item of the first type;
   selecting, by the server, a set of content items from the ranked list of content items as the content for the user;
   transmitting, by the server to the electronic device over the communication network, the content for display to the user in the application.

2. The method of claim 1, wherein the first model is a generative model, and wherein the first output is a generative output representing the synthesized content item of the first type.

3. The method of claim 1, wherein the content items of the first type in recommendation system exclude the synthesized content item of the first type.

4. The method of claim 1, wherein the content items of the first type in recommendation system include the synthesized content item of the first type.

5. The method of claim 1, wherein the method further comprises acquiring item data associated with a plurality of content items of the first type, and wherein the ranking further comprises ranking, by the server, the plurality of content items of the first type and the plurality of content items of the second type into the ranked list of content items.

6. The method of claim 1, wherein the selecting comprises excluding, by the server, from the set of content items at least one content item in the ranked list of content items.

7. The method of claim 6, wherein the excluding comprises determining, by the server, a similarity score of an other content item in the ranked list with the at least one content item, the other content item being ranked above the at least one content item, in response to the similarity score being above a pre-determined threshold, and excluding, by the server, the at least one content item from the set of content items.

8. The method of claim 1, wherein the content items of the first type are non-duplicable content items.

9. The method of claim 1, wherein the content items of the first type are real-estate properties.

10. The method of claim 1, wherein the content items of the second type are serially produced content items.

11. A server for generating content for a user, the content to be displayed by an electronic device executing an application, the electronic device being communicatively coupled to the server by a communication network, the server hosting a recommendation system, the server being configured to:
   acquire, from the electronic device over the communication network, a request for providing the content to the user;
   acquire user data associated with the user indicative of previous user interactions of the user with content items of the recommendation system;
   generate, using a first model, a first output for the user based on the user data, the first output being representative of a synthesized content item of a first type,
      content items of the first type having a frequency ratio below a threshold ratio, the frequency ratio being a number of events of a pre-determined type that have been performed on a given content item by users of the recommendation system over a number of times that users have been presented with an indication of the events of the pre-determined type having been performed on the given content item;

acquire item data associated with a plurality of content items of a second type, the first type being distinct from the second type, content items of the second type having a frequency ratio above the threshold ratio;

rank, using a second model, the content items of the second type into a ranked list based on the first output, the user data, and the item data, a rank of a given content item of the second type being indicative of a likelihood of that the user interacts with the given content item of the second type if the user performs an event of the pre-determined type on the given content item of the first type;

select a set of content items from the ranked list of content items as the content for the user;

transmit, to the electronic device over the communication network, the content for display to the user in the application.

12. The server of claim 11, wherein the first model is a generative model, and wherein the first output is a generative output representing the synthesized content item of the first type.

13. The server of claim 11, wherein the content items of the first type in recommendation system exclude the synthesized content item of the first type.

14. The server of claim 11, wherein the content items of the first type in recommendation system include the synthesized content item of the first type.

15. The server of claim 11, wherein the server is further configured to acquire item data associated with a plurality of content items of the first type, and wherein the server configured to rank is further configured to rank the plurality of content items of the first type and the plurality of content items of the second type into the ranked list of content items.

16. The server of claim 11, wherein the server configured to select is configured to exclude from the set of content items at least one content item in the ranked list of content items.

17. The server of claim 16, wherein the server configured to exclude is configured to determine a similarity score of an other content item in the ranked list with the at least one content item, the other content item being ranked above the at least one content item, in response to the similarity score being above a pre-determined threshold, the server is configured to exclude the at least one content item from the set of content items.

18. The server of claim 11, wherein the content items of the first type are non-duplicable content items.

19. The server of claim 11, wherein the content items of the first type are real-estate properties.

20. The server of claim 11, wherein the content items of the second type are serially produced content items.

\* \* \* \* \*